June 14, 1932. W. H. PRATT 1,863,414
DEMAND METER
Filed Dec. 27, 1930
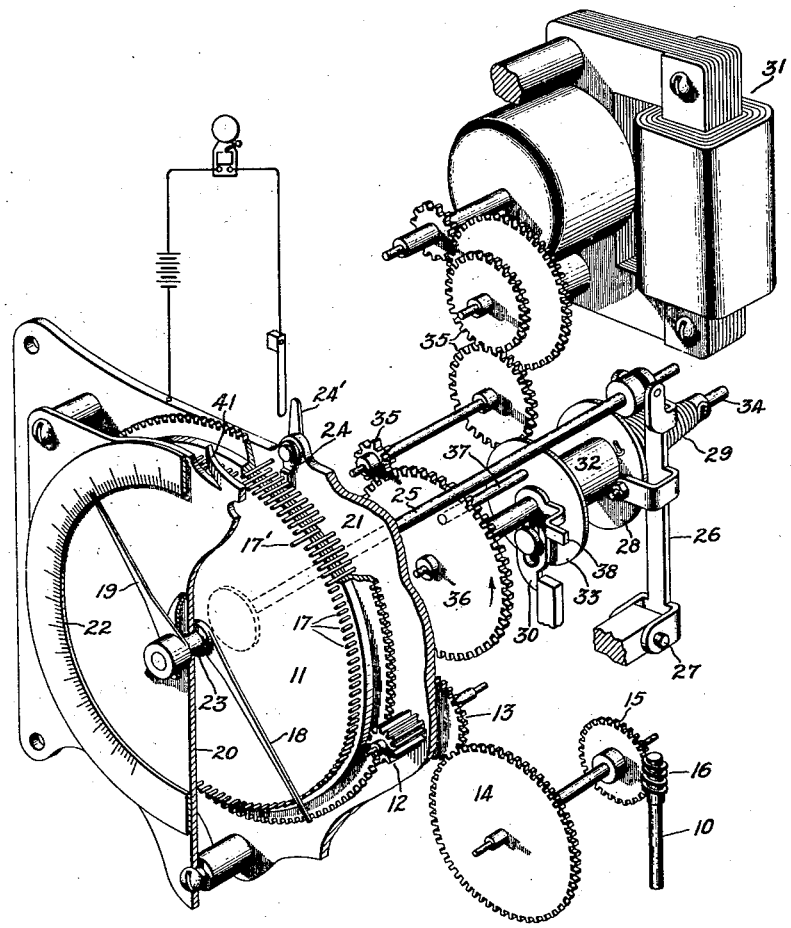
Inventor:
William H. Pratt,
by Charles E. Mullen
His Attorney.

Patented June 14, 1932

1,863,414

UNITED STATES PATENT OFFICE

WILLIAM H. PRATT, OF LYNN, MASSACHUSETTS, ASSIGNOR TO GENERAL ELECTRIC COMPANY, A CORPORATION OF NEW YORK

DEMAND METER

Application filed December 27, 1930. Serial No. 505,110.

My invention relates to demand meters and its object is to provide an easily read, accurate, reliable demand meter at a low cost. The demand meter embodying my invention is of the block interval type and is employed in connection with a meter such as a watthour meter to indicate the maximum demand occurring over a predetermined interval of time.

The features of my invention which are believed to be novel and patentable are pointed out in the claims appended hereto. For a better understanding of the invention reference is made in the following description to the accompanying drawing which illustrates a perspective view, partially in section, of a demand meter embodying my invention.

In many previous types of demand meters the demand mechanism has been built into the watthour meter register. This necessitates an undesirable crowding of the parts and imposes limitations on the design. My demand meter is built separately from the usual watthour meter register but will ordinarily be used in connection with a watthour meter provided with the usual registering dials built as a separate unit.

In the drawing the watthour register is not shown but the watthour meter shaft from which such a register is driven is represented at 10. This shaft also drives the indicating portion of my demand meter and it will be understood that this shaft rotates at a speed proportional to some metered quantity.

In a common form of demand meter a dog is advanced by the watthour meter and is reset to a zero position at the end of the demand interval by a timing device. This dog advances a friction pointer which registers the maximum demand. In such devices a friction clutch or its equivalent is usually provided between the watthour meter and dog. According to my invention this friction clutch is eliminated and instead of a dog which is reset to zero at the end of the demand interval I provide a wheel which is continuously driven in a forward direction by the watthour meter and provide on this wheel a large number of movable members such as pins any one of which may be employed as a dog. Instead of rotating this wheel backward at the end of a demand interval the control is transferred from one pin to another pin located at the zero position.

In the drawing this wheel is shown at 11 and is driven by the watthour meter through gears 12, 13, 14, 15 and 16. This wheel may be appropriately termed a dog wheel. The pins which serve as dogs are shown at 17 and are evenly spaced in a circle about the peripheral portion of the wheel and are freely slidable therethrough. Any one of such pins may be pushed forward as shown at 17' and when so positioned serves as the dog and is adapted, if rotated far enough during the demand interval, to engage the pusher arm 18 secured to the friction pointer 19 to move it up scale. The dog wheel 11 is positioned between two plates 20 and 21 both parallel to the plane of the wheel. The plate 20 serves as the support for the demand meter scale 22 and as a stop plate for limiting the forward movement of the pins. The friction pointer and integral arm 18 are frictionally pivoted in this plate at 23 on the same axis of rotation as that of wheel 11. Plate 21 serves as a stop plate for a rearward movement of the pins. When the parts are assembled the pins cannot move endwise far enough to drop out of place. However, the ends of the pins may be upset if desired to prevent them from falling out.

At the end of a demand interval the pin 17', which was pushed forward to serve as the dog over such interval, is moved back to an inactive position and another pin located at the zero position on the dog wheel is selected and moved forward and rendered active to serve as the dog for the next demand interval. The zero position is opposite the stop arm 24 pivoted in the plate 21 and corresponds to the position of pusher arm 18 when the friction pointer 19 is at the zero end of its scale 22. Arm 24 has a portion extending outwardly from plate 21 toward the dog wheel. The pin resetting mechanism for repositioning the pins at the end of a demand interval comprises means for moving the dog wheel bodily first toward plate 20 and then toward plate 21 and then back again to an intermediate or central position between the plates. By the first movement pin 17' comes against plate 20 and is moved back even with the other pins in the dog wheel. The second movement causes the pin adjacent the arm 24 to be engaged thereby and shoved forward so that it extends beyond the others as does pin 17' in the illustration. The final movement of wheel 11 back to a central position brings this new pin into position to serve as a dog which, if rotated far enough, will engage arm 18 and move pointer 19 up scale.

The dog wheel is rotatably mounted on the forward end of a rod 25. Rod 25 has a sliding fit in plate 21 and is secured to the upper end of a lever 26 at its rear end. Lever 26 is pivoted at 27 and has parts which engage opposite surfaces of a cam plate 28. At the end of a demand interval means are provided for rotating cam plate 28 exactly one revolution and this cam is so shaped that during such revolution it reciprocates lever 26, rod 25, and dog wheel 11 forward, back, and forward again to the mid-position represented in the illustration, thereby accomplishing the repositioning of the dog pins as previously described.

Cam 28 is rotated by a spring 29 but is normally held against rotation by a catch 30. A timing motor 31 serves to wind spring 29 and release the catch 30. More specifically, cam 28 is secured to a hub 32 to which is also secured a circular plate 33. This spool-shaped structure has a bearing on a shaft 34 which extends therethrough. Stop 30 is slidably mounted on 33 and when in the position illustrated engages with a stationary stop to hold the cam 28 against rotation. Spring 29 is fastened between the cam 28 and the rear end of shaft 34 and is coiled about this shaft. The timing motor 31 drives shaft 34 at a constant rate through gear train 35 in a direction represented by the arrow on the final gear 36. This is in the direction to continuously wind spring 29. Gear 36 also carries a pin 37 extending toward plate 33 a sufficient distance to engage the forwardly extending finger 38 on catch 30. Thus, once each revolution of gear 36, pin 37 engages finger 38 and lifts catch 30 releasing it, thereby allowing cam 28 to make one revolution before it is checked again by the catch 30. The timing motor 31 may be a small synchronous electric motor of the self-starting type geared down to cause the wheel 36 to make one revolution in the timing interval desired. The rotation of cam 28 and the lateral movement of the dog wheel at the end of a demand interval takes place in a very short interval of time, i. e., substantially instantaneously.

The operation of the demand meter may be reviewed as follows: Let us assume that the wheel 11 is being rotated in a clockwise direction by the watthour meter shaft 10 and that the gear wheel 36 is being rotated in a counter-clockwise direction by the timing motor 31, thereby winding spring 29. The position of pin 37 indicates that approximately one-quarter of the demand meter time interval has passed since the last resetting operation. 17' represents the pin which was in the zero position opposite arm 24 at the beginning of the demand interval and which was then moved forward into active position. The rotational distance of pin 17' from the zero position corresponds to the integrations of the watthour meter over the portion of the time interval which has elapsed. The position of pointer 19 marks the greatest maximum demand registered in any previous time interval since the pointer was reset to a zero position by hand. If the demand in the assumed time interval is less than that indicated by pointer 19, pin 17' will not reach arm 18 before the end of the interval and pointer 19 will remain in the position represented. If the demand should be greater than that indicated, pin 17' will come against arm 18 and move pointer 19 further up scale in a clockwise direction and leave it there at the end of the interval. As the end of the time interval approaches, pin 37 comes against the under side of projection 38 of catch 30, lifting it until it is released from its stop. Parts 28, 30, 32 and 33 make a revolution in a counterclockwise direction substantially instantaneously, being driven by spring 29. Catch 30 is forced outward by centrifugal force and stops this mechanism again in the position shown. The rotation of cam 28 oscillates wheel 11 in a lateral direction, first in one direction, then in the other, and then back to a central position, thereby pushing pin 17' into inactive position and pushing another pin located at the zero position forward into active position. During this lateral movement of the dog wheel, driving relation with the watthour meter shaft 10 is maintained by reason of the length of gear 12.

The flat surface of arm 24 is wide enough always to engage at least one pin. It might engage two pins but if so, no harm is done: only the forward one can serve as a dog and both will be returned to inactive position at the end of the interval.

I have also made provision to care for conditions where the demand might exceed the limit of the meter during a demand interval. In such a case it is desirable to leave the demand pointer at the upper limit of the scale which is about 300 degrees in length and not carry it over into the beginning end of the scale. To accomplish this I provide an offset portion 41 in plate 20 curved to the rear adjacent the position of arm 18 when the latter is in a position corresponding to full scale reading. When arm 18 approaches this point the curved finger 41 draws arm 18 toward plate 20 a sufficient distance to allow the driving dog pin 17′ to slip past it thereby rendering the dog inactive. The resulting indication will show that the demand has reached and possibly exceeded the limit of the scale. No injury or strain on the demand mechanism results.

The arm 24 which extends forward from the back plate 21 at the zero point is preferably freely pivoted in plate 24 and takes the position shown due to gravity. The purpose of this pivoted arrangement is to safeguard against a possible blocking of wheel 11 and the watthour meter in case one or more pins 17 should become misplaced and extend too far to the rear (see the rearwardly extending pin opposite arm 24 for example), or in case the resetting mechanism should fail and leave the wheel 11 too close to plate 21. A displaced pin approaching arm 24 would simply swing arm 24 out of the way and pass this point without damage to the apparatus or blocking of the meter driven parts. As soon as the pin passes this point the arm will return to its normal position by gravity. Under normal conditions this condition will not occur but in case it does occur, the normal operation of the watthour meter is not affected. Arm 24 may be provided with a handle 24′ so that it may be permanently swung out of the position shown and I may make use of this handle for closing an alarm contact, as represented. Such an alarm may be useful to notify the station operator of some predetermined demand load determined in advance during the time interval by manually pushing a selected pin to the rear so that the alarm will be operated when such demand load is reached, or it may be useful to notify the operator in case the resetting mechanism gets out of order.

Other means for resetting the pins at the end of a demand interval will occur to those skilled in the art, and consequently I do not wish to limit my invention to the particular arrangement illustrated.

What I claim as new and desire to secure by Letters Patent of the United States, is:

1. A demand meter comprising a scale, a friction pointer cooperating with said scale, a wheel continuously driven in accordance with a metered quantity, a plurality of movable members spaced apart in a circle on said wheel, any one of which may be moved from an inactive position into an active position where it will serve as a dog for advancing the friction pointer, and time controlled means for moving a selected one of said members into said active position at the beginning of a predetermined time interval and replacing it to its former inactive position again at the end of such interval.

2. A demand meter comprising a scale, a friction pointer cooperating therewith, a wheel mounted for rotation on the axis of rotation of the friction pointer, said wheel being continuously driven in accordance with a metered quantity, a plurality of devices on said wheel equally spaced in a circle concentric with the axis of rotation of the wheel, means for rendering said devices active or inactive as dogs for moving the friction pointer up scale, and time controlled means for rendering a selected one of said devices active at the beginning of a predetermined interval of time and rendering it inactive at the end of such time interval.

3. A demand meter comprising a scale, a friction pointer cooperating therewith, a wheel mounted for rotation on the axis of rotation of the friction pointer, means for continuously driving said wheel in accordance with a metered quantity, a plurality of pins slidably mounted through the wheel and equally spaced in a circle about such axis of rotation, a stop member for all of said pins on one side of said wheel, a stop member for one of said pins on the other side of said wheel, and time controlled means for producing relative lateral movement between said wheel and stop members at predetermined intervals of time whereby a selected one of said pins is positioned on said wheel to serve as a dog for advancing the friction pointer up scale during the period between such operations.

4. A demand meter comprising a scale, a friction pointer cooperating therewith, a rotary member advanced continuously in accordance with a metered quantity, a plurality of dog devices on said member equally spaced in a circle about its axis of rotation for moving said friction pointer up scale from a zero indicating position, each of said devices being movable from an inactive to an active position and vice versa, and time controlled means operated at predetermined intervals of time for rendering active the dog device which happens to be in a position corresponding to the zero indicating position of the pointer and rendering other dog devices inactive to move said pointer.

5. In a demand meter, a scale, a friction pointer cooperating with the scale, a dog operated in accordance with a metered quantity for advancing said pointer up scale during a demand period, means for rendering said dog inactive to move said pointer at the end of a demand interval, and means for rendering said dog inactive to move said pointer when it reaches the limit of its scale prior to the end of a demand interval.

6. A demand meter comprising demand indicating means, a wheel continuously rotated in accordance with a metered quantity, a plurality of pins extending through a peripheral portion of said wheel, said pins being evenly spaced and slidably mounted in said wheel whereby any one of such pins may be slid endwise to a sufficient extent to serve as a dog for operating the demand indicating means, time controlled means for resetting said pins at the end of a demand interval, and means whereby the particular pin which is in a position corresponding to a zero demand indication is simultaneously set for service as a dog over the next demand interval.

7. A demand meter comprising a wheel continuously rotated in response to a metered quantity, a plurality of pins evenly spaced and slidably mounted through a peripheral portion of said wheel, a friction pointer with a pusher arm in front of said wheel, whereby any one of said pins may be slid forward to serve as a dog for advancing said pointer, a stop plate in front of said wheel for limiting the forward movement of the pins, a stop member adjacent to and back of the peripheral portion of said wheel located opposite the zero indicating position of said pusher arm, and time controlled means for substantially instantaneously moving said wheel laterally first toward the front plate, second toward the rear stop member, and third back to an intermediate position, said movements being effected at predetermined time intervals to reposition said pins so as to transfer control from the pin which served as a dog over the preceding time interval to a pin located at the zero position.

8. A demand meter as claimed in claim 7 characterized by the fact that the back stop member is pivotally mounted so as to be freely swung out of the path of a pin extending a sufficient distance to the rear of the wheel to engage such stop member while the wheel is in the intermediate lateral position.

In witness whereof, I have hereunto set my hand this 24th day of December, 1930.

WILLIAM H. PRATT.